(12) United States Patent
Hiroe

(10) Patent No.: US 11,882,257 B2
(45) Date of Patent: Jan. 23, 2024

(54) IMAGE FORMING APPARATUS AND METHOD OF CONTROLLING IMAGE FORMING APPARATUS COMPRISING A SCANNER AND PROCESSOR TO GENERATE A FIRST COMBINED IMAGE THAT INCLUDES AN IMAGE OF A DOCUMENT AND A READING DIRECTION IMAGE THAT INDICATES A READING DIRECTION OF THE SCANNER AND HAS A SHAPE INDICATING THE READING MODE

(71) Applicant: Toshiba Tec Kabushiki Kaisha, Tokyo (JP)

(72) Inventor: Yoshihito Hiroe, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/178,466

(22) Filed: Mar. 3, 2023

(65) Prior Publication Data

US 2023/0291860 A1    Sep. 14, 2023

(30) Foreign Application Priority Data

Mar. 8, 2022    (JP) ................................ 2022-035003

(51) Int. Cl.
*H04N 1/393*    (2006.01)
*H04N 1/00*    (2006.01)

(52) U.S. Cl.
CPC ....... *H04N 1/3935* (2013.01); *H04N 1/00785* (2013.01)

(58) Field of Classification Search
CPC ............... H04N 1/0047; H04N 1/0074; H04N 1/00358; H04N 1/00368; H04N 1/00374;
(Continued)

(56) References Cited

U.S. PATENT DOCUMENTS 5,247,371 A    9/1993   Hikawa et al.
5,896,202 A *  4/1999   Ozaki ...................... G06T 3/60
                                                                358/448

(Continued)

FOREIGN PATENT DOCUMENTS

JP    S644167 A     1/1989
JP    H0535938 A    2/1993
(Continued)

OTHER PUBLICATIONS

U.S. Appl. No. 17/679,040.
Extended European Search Report dated Jul. 26, 2023 in related European Patent Application 23160620.3, 8 pages.

*Primary Examiner* — Chad Dickerson
(74) *Attorney, Agent, or Firm* — Kim & Stewart LLP

(57)    ABSTRACT

An image forming apparatus includes a scanner configured to read an image of a document and generate image data of the image according to a reading mode, a storage device configured to store the image data and the reading mode used when reading the image of the document, and a processor. The processor generates a combined image that includes the image of the document and a reading direction image that indicates a reading direction of the scanner and has a shape indicating the reading mode, and store data of the combined image in the storage device. The processor determines a position of the reading direction image in the combined image and a size of the reading direction image in the combined image, based on a reading resolution of the scanner and a resolution of the image data stored in the storage device.

19 Claims, 17 Drawing Sheets

(58) Field of Classification Search
CPC ........... H04N 1/00379; H04N 1/00785; H04N 1/3935
USPC ................................. 358/1.2, 1.1, 1.11–1.18
See application file for complete search history.

(56) References Cited

U.S. PATENT DOCUMENTS

| | | | |
|---|---|---|---|
| 11,323,589 B2* | 5/2022 | Hiroe | H04N 1/3871 |
| 11,595,544 B1* | 2/2023 | Kanamori | H04N 1/32149 |
| 2009/0316163 A1* | 12/2009 | Hanawa | H04N 1/3871 |
| | | | 358/448 |
| 2019/0196379 A1* | 6/2019 | Sugata | G03G 15/5058 |
| 2020/0177761 A1* | 6/2020 | Mizuno | H04N 1/3248 |
| 2021/0409570 A1 | 12/2021 | Hiroe | |

FOREIGN PATENT DOCUMENTS

| | | |
|---|---|---|
| JP | H05091260 A | 4/1993 |
| JP | 2006303920 A | 11/2006 |
| JP | 2006333411 A | 12/2006 |
| JP | 2007194962 A | 8/2007 |

* cited by examiner

FIG. 14

| CHARACTER READ MODE | PHOTOGRAPH READ MODE | CHARACTER AND PHOTOGRAPH READ MODE | OTHERS |
|---|---|---|---|
| 671 | 672 | 673 | 674 |

FIG. 15

| CHARACTER FORMING MODE | PHOTOGRAPH FORMING MODE | CHARACTER AND PHOTOGRAPH FORMING MODE | GRAYSCALE MODE | OTHERS |
|---|---|---|---|---|
| 681 | 682 | 683 | 684 | 685 |

IMAGE FORMING APPARATUS AND METHOD OF CONTROLLING IMAGE FORMING APPARATUS COMPRISING A SCANNER AND PROCESSOR TO GENERATE A FIRST COMBINED IMAGE THAT INCLUDES AN IMAGE OF A DOCUMENT AND A READING DIRECTION IMAGE THAT INDICATES A READING DIRECTION OF THE SCANNER AND HAS A SHAPE INDICATING THE READING MODE

CROSS-REFERENCE TO RELATED APPLICATION

This application is based upon and claims the benefit of priority from Japanese Patent Application No. 2022-035003, filed Mar. 8, 2022, the entire contents of which are incorporated herein by reference.

FIELD

Embodiments described herein relate generally to an image forming apparatus and a method of controlling image forming apparatus.

BACKGROUND

A reading direction of a document is important information in investigating a defect in a scanned image. An image forming direction of a sheet is important information in investigating the defect in a printed image. If information about a sheet conveying direction, such as the reading direction and the image forming direction, is missing, the investigation of defect could take a lot of time and effort.

DESCRIPTION OF THE DRAWINGS

FIG. 14 is a diagram illustrating an example of symbols representing different reading modes.

FIG. 15 is a diagram illustrating an example of symbols representing different image forming modes.

DETAILED DESCRIPTION

Embodiments provide an image forming apparatus capable of easily specifying the conveying direction of the sheet.

In general, according to one embodiment, there is provided an image forming apparatus including a scanner configured to read an image of a document and generate image data of the image according to a reading mode, a storage device configured to store the image data and the reading mode that was set as a parameter of the scanner when reading the image of the document, and a processor. The processor is configured to generate a combined image that includes the image of the document and a reading direction image that indicates a reading direction of the scanner and has a shape indicating the reading mode, and store data of the combined image in the storage device. The processor is further configured to determine a position where the reading direction image is to be disposed relative to the image of document in the combined image and a size of the reading direction image in the combined image, based on a first resolution indicating a reading resolution of the scanner and a second resolution indicating a resolution of the image data stored in the storage device.

As an image forming apparatus of an embodiment, an image forming apparatus capable of easily specifying a reading direction or an image forming direction can be provided. The image forming apparatus according to the embodiment will be described in detail below.

Figure 1:
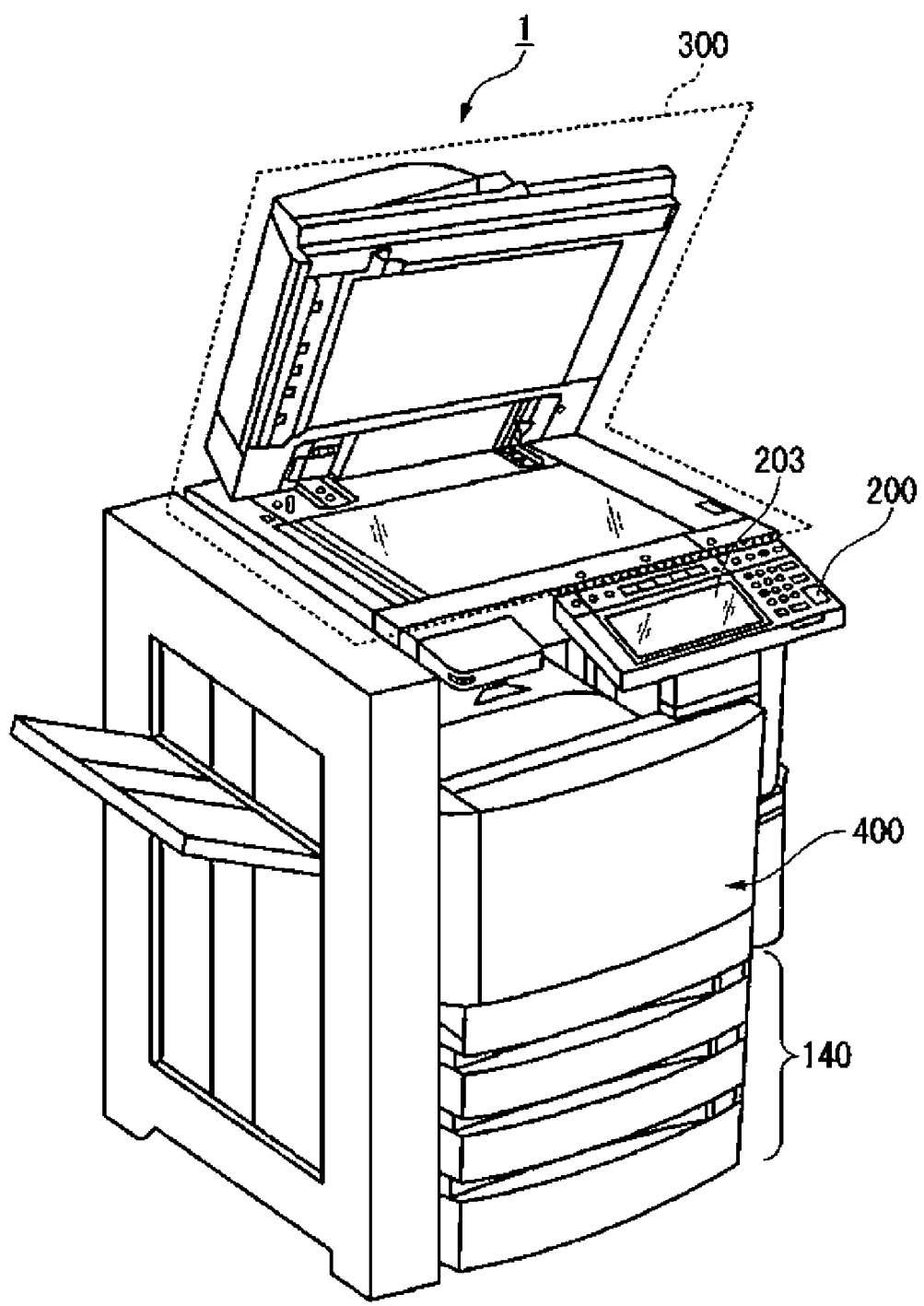
FIG. 1 is an external view illustrating an example of an overall configuration of an image forming apparatus according to an embodiment.
Figure 2:
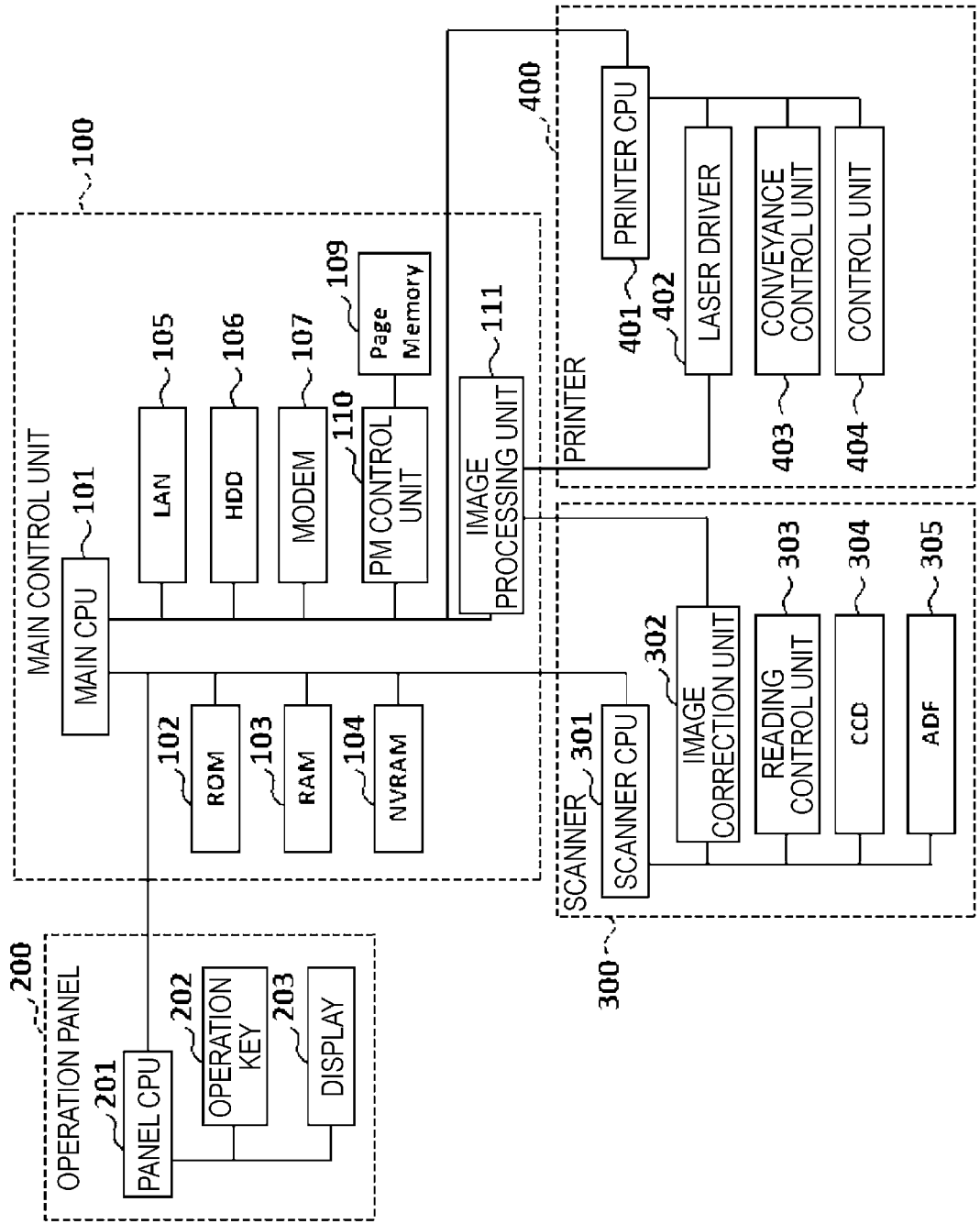
FIG. 2 is a hardware block diagram illustrating a hardware configuration of the image forming apparatus.

FIG. 1 is an external view illustrating an example of an overall configuration of an image forming apparatus 1 according to an embodiment. FIG. 2 is a hardware block diagram illustrating a hardware configuration of the image forming apparatus 1. First, description will be made mainly using FIG. 1. The image forming apparatus 1 is, for example, a multifunction machine. The image forming apparatus 1 includes a main control unit 100, a sheet accommodation unit 140, an operation panel 200, a scanner 300, and a printer 400. The image forming apparatus 1 forms an image on a sheet using a developer. The developer is, for example, toner. In the following description, the developer will be described as toner. The sheet is, for example, paper or label paper. Any sheet may be used as long as the image forming apparatus 1 can form an image on a front surface of the sheet.

The operation panel 200 includes one or more operation keys 202 and a display 203. The operation panel 200 receives an operation by a user. The operation panel 200 outputs a signal corresponding to the operation performed by a user to the main control part 100.

The display 203 is an image display device such as a liquid crystal display or an organic electro luminescence (EL) display. The display 203 displays various information about the image forming apparatus 1.

The printer 400 forms an image on the sheet based on image data generated by the scanner 300 or image data received via a network. The printer 400 forms the image using toner. A sheet on which the image is formed may be a sheet accommodated in the sheet accommodation unit 140 or may be a manually-fed sheet. In the following description, forming an image includes printing the image.

The sheet accommodation unit 140 accommodates the sheets used for image formation in the printer 400.

The scanner 300 reads an image to be read based on brightness and darkness of light. The scanner 300 records the read image data. The recorded image data may be transmitted to another information processing apparatus via a network. An image indicated by the recorded image data may be formed on the sheet by the printer 400.

Next, description will be made mainly using FIG. 2. In FIG. 2, the image forming apparatus 1 includes the main control unit 100, the operation panel 200, the scanner 300, and the printer 400. The image forming apparatus 1 includes a main Central Processing Unit (CPU) 101 in the main control unit 100, a panel CPU 201 in the operation panel 200, a scanner CPU 301 in the scanner 300, and a printer CPU 401 in the printer 400.

The main control unit 100 includes the main CPU 101, a Read Only Memory) (ROM) 102, a Random Access Memory (RAM) 103, an Non-Volatile RAM (NVRAM) 104, a network controller 105, an Hard Disk Drive (HDD) 106, a modem 107, a page memory 109, a page memory (PM) control unit 110, and an image processing unit 111.

The main CPU 101 controls an entire operation of the image forming apparatus 1. The ROM 102 stores data needed for control such as a control program. The RAM 103 temporarily stores data. The NVRAM 104 is a non-volatile memory.

The network controller 105 connects the image forming apparatus 1 and a network. The image forming apparatus 1 communicates with an external device, for example, a server, a personal computer (PC), and the like, via the network controller 105. The HDD 106 stores data such as an image used for image formation and an image read by the scanner 300. The HDD 106 is an example of a storage device. In general, any nonvolatile memory including flash memory may be used as a storage device in place of the HDD 106. Of the image data stored in HDD 106, a header of the image data read by the scanner 300 contains information indicating reading resolution when reading and the reading resolution is recorded in the HDD 106. The modem 107 connects the image forming apparatus 1 and a telephone line.

The page memory 109 stores a plurality of pages of image data for each page. The page memory control unit 110 controls the page memory 109. The image processing unit 111 performs image processing on the image data. Specific examples of image processing include color conversion processing, range correction processing, sharpness adjustment processing, gamma correction and halftone processing, and pulse width modulation processing (PWM). The image processing unit 111 may be implemented as hardware such as an application specific integrated circuit (ASIC), or may be implemented as software executed in the main CPU 101.

The operation panel 200 includes the panel CPU 201, the operation key 202, and the display 203. The panel CPU 201 controls the operation panel 200. The panel CPU 201 is connected to the main CPU 101 by a bus. If the panel CPU 201 receives an instruction about display from the main CPU, the panel CPU 201 controls a screen of the display 203 according to the received instruction. If the panel CPU 201 receives numerical values, processing to be executed, and setting information from the operation key 202, the panel CPU 201 outputs data indicating the numerical values, processing to be executed, and setting information to the main CPU 101. The operation key 202 is an input device for inputting processing to be executed, setting information, numerical values, and the like. As a specific example of information received by the operation keys 202, various instructions and settings such as a type (size and orientation) of the sheet on which the image is to be formed and a magnification of image formation can be performed. The display 203 is a display device such as a liquid crystal display or an organic EL display. The display 203 may be configured as a touch panel.

The scanner 300 includes the scanner CPU 301, an image correction unit 302, a reading control unit 303, a charge coupled device (CCD) 304, and an auto document feeder (ADF) 305. The scanner CPU 301 controls the scanner 300. The image correction unit 302 includes, for example, an Analog-to-digital (A/D) conversion circuit, a shading correction circuit, and a line memory. The A/D conversion circuit converts each of R, G, and B analog signals output from the CCD 304 into a digital signal. The ADF 305 is an automatic document feeder. The ADF 305 takes in the sheet set by the user into a conveyance path in a conveying direction according to the orientation in which the sheet is set. The ADF 305 conveys the sheet by rotating a conveying roller in the conveyance path, and the CCD 304 reads an image on the conveyed sheet.

The printer 400 includes the printer CPU 401, a laser driver 402, a conveyance control unit 403 and a control unit 404. The printer CPU 401 controls the printer 400. The laser driver 402 drives a laser to form an electrostatic latent image on a photoreceptor. The conveyance control unit 403 conveys a sheet on which an image is to be formed. The control unit 404 forms an image on the sheet conveyed by the conveyance control unit 403 by controlling a device such as the laser driver 402.

Figure 3:
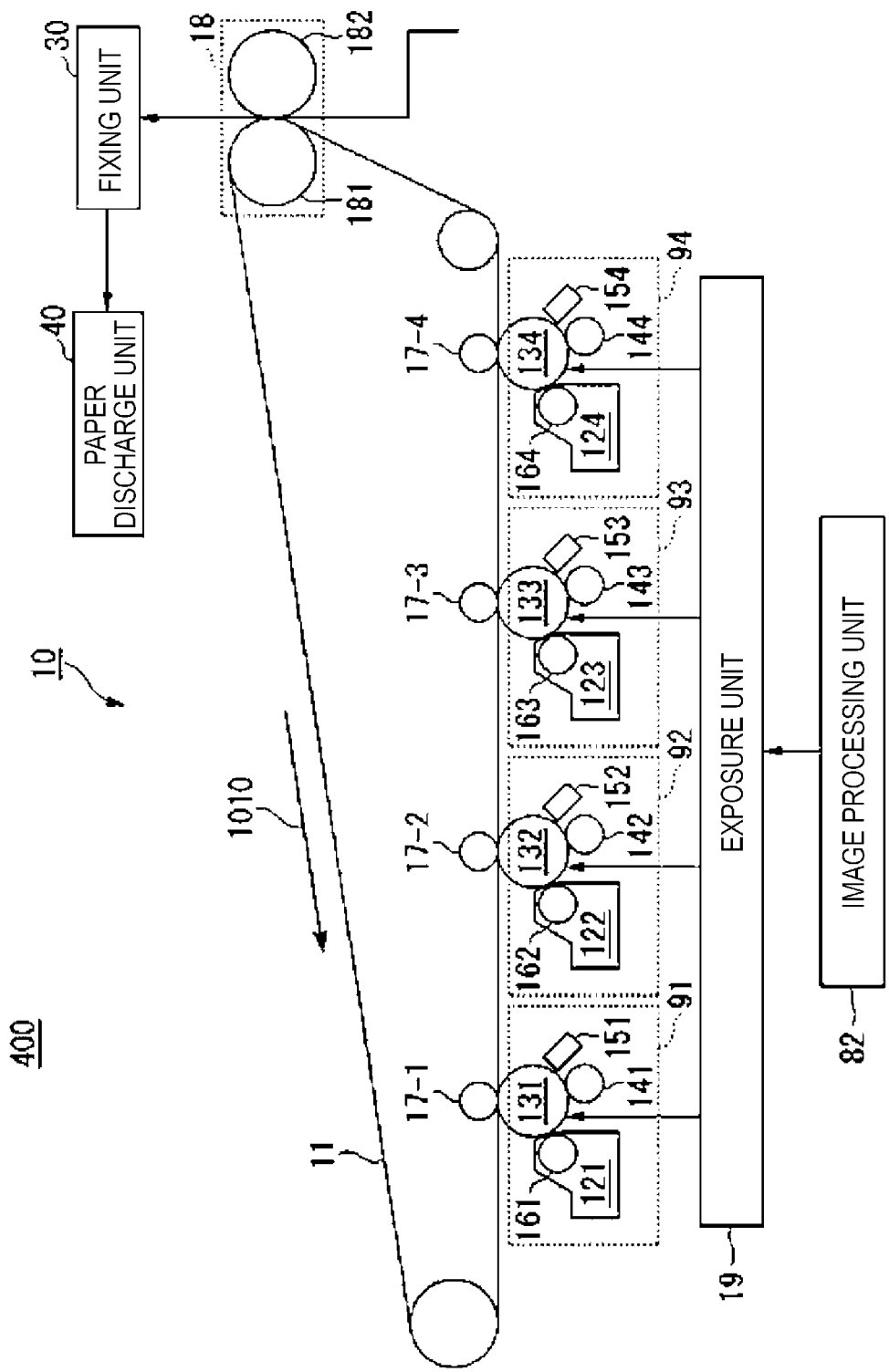
FIG. 3 is a diagram illustrating an example of an internal configuration of a printer.

FIG. 3 is a diagram illustrating an example of an internal configuration of the printer 400. In the example of FIG. 3, the printer 400 is a quadruple-tandem type printer. However, the printer 400 need not be limited to the quadruple-tandem type printer.

The printer 400 includes an image forming unit 10, a fixing unit 30 and a paper discharge unit 40. The image forming unit 10 includes an intermediate transfer body 11, development devices 91 to 94, a plurality of primary transfer rollers 17 (17-1 to 17-4), a secondary transfer unit 18 and an exposure unit 19.

The intermediate transfer body 11 may be configured using, for example, an endless belt. The intermediate transfer body 11 is rotated in a direction of arrow 1010 by a roller. In this embodiment, upstream and downstream are defined based on the direction in which the intermediate transfer body 11 moves. Visible images generated by the development devices 91 to 94 are transferred onto the front surface of the intermediate transfer body 11.

The development devices 91-94 use toners of different properties to form the visible images, respectively. For example, toners of different colors may be used in some development devices. As toners of different colors, yellow (Y), magenta (M), cyan (C), and black (K) toners may be used. In some development devices, toners decolored by external stimuli (for example, heat) may be used. In some development devices, special toner such as glossy toner and fluorescent toner may be used.

In FIG. 3, the development device 91 is positioned most upstream of the four development devices, and the development device 94 is positioned most downstream of the four development devices.

The development devices 91-94 differ in the properties of the toner to be used, but have the same configuration. The development device 91 includes a development unit 121, a photoreceptor drum 131, a charger 141, a cleaning blade 151, and a development drum 161. The development device 92 includes a development unit 122, a photoreceptor drum 132, a charger 142, a cleaning blade 152, and a development drum 162. The development device 93 includes a development unit 123, a photoreceptor drum 133, a charger 143, a cleaning blade 153, and a development drum 163. The development device 94 includes a development unit 124, a photoreceptor drum 134, a charger 144, a cleaning blade 154, and a development drum 164.

In the following description, the development unit 121, the development unit 122, the development unit 123, and the development unit 124 are referred to as a development unit 12 unless the development units are distinguished from each other. The same applies to a photoreceptor drum 13, a charger 14, a cleaning blade 15, and a development drum 16.

Hereinafter, a development device will be described using the development device 91 as an example. The development device 91 includes the development unit 121, the photoreceptor drum 131, the charger 141, the cleaning blade 151 and the development drum 161. The development unit 121 stores toner and carrier. The development unit 121 causes toner to adhere to the photoreceptor drum 131 by the development drum 161.

The photoreceptor drum 131 has a photoreceptor (photosensitive region) on an outer peripheral surface thereof. The photoreceptor is, for example, an organic photoconductor (OPC). The photoreceptor drum 131 is exposed by the exposure unit 19 and an electrostatic latent image is formed on the front surface thereof. The charger 141 uniformly charges the front surface of the photoreceptor drum 131. The cleaning blade 151 is, for example, a plate-like member. The cleaning blade 151 is made of rubber such as urethane resin, for example. The cleaning blade 151 removes toner adhering to the photoreceptor drum 131.

Next, an outline of an operation of the development device 91 will be described. The photoreceptor drum 131 is charged to a predetermined potential by the charger 141. Next, the exposure unit 19 irradiates the photoreceptor drum 131 with light. As a result, the potential of a region irradiated with light on the photoreceptor drum 131 varies. By this variation, an electrostatic latent image is formed on the front surface of the photoreceptor drum 131. The electrostatic latent image on the front surface of photoreceptor drum 131 is developed with toner of the development unit 121. That is, a visible image, which is an image developed with toner, is formed on the front surface of the photoreceptor drum 131.

The primary transfer rollers 17 (17-1 to 17-4) transfer the visible images formed on the photoreceptor drums by the respective development devices 91 to 94 onto the intermediate transfer body 11.

The secondary transfer unit 18 includes a secondary transfer roller 181 and a secondary transfer counter roller 182. The secondary transfer unit 18 collectively transfers the visible images formed on the intermediate transfer body 11 onto a sheet on which an image is to be formed. Transfer by the secondary transfer unit 18 is realized by, for example, a potential difference between the secondary transfer roller 181 and the secondary transfer counter roller 182.

The exposure unit 19 forms the electrostatic latent image by irradiating the photoreceptor drums of the development devices 91-94 with light. The exposure unit 19 includes a light source such as a laser or a light emitting diode (LED). In this embodiment, the exposure unit 19 includes the laser and operates under the control of the laser driver 402.

The fixing unit 30 fixes the visible image onto the sheet by applying heat and pressure to the visible image transferred onto the sheet. The paper discharge unit 40 discharges the sheet on which the visible image is fixed by the fixing unit 30 to the outside of the image forming apparatus 1.

Next, a reading direction image indicating the reading direction and an image forming direction image indicating the image forming direction will be described. The reading direction image and the image forming direction image are images for easily specifying the reading direction and the image forming direction by a serviceman who performs maintenance, inspection, and the like of the image forming apparatus. If the reading direction or the image forming direction is specified, the time and effort required to investigate a defect of the image forming apparatus can be greatly reduced compared with a case where the reading direction or image forming direction is not specified. In one embodiment, the reading direction image and the image forming direction image are recorded in the HDD 106 in advance and has the maximum resolution of the scanner 300.

First, the reading direction image will be described. The reading direction image is an image indicating the reading direction in the scanner 300. The reading direction image may be, for example, an image that indicates the reading direction in the scanner 300 according to the position of the reading direction image. When scanning a document, the image forming apparatus 1 combines a reading direction image indicating the reading direction in the scanner 300 with the image of the document. Specifically, the reading direction image is combined with the image of the document as follows. The image processing unit 111 of the main control unit 100 combines the reading direction image with the image of the document. The image processing unit 111 records the combined image data in the HDD 106.

The reading direction in the scanner 300 is a sub-scanning direction of a line sensor, and is a direction from a side last read by the line sensor to a side first read by the line sensor, of four sides of the document.

Figure 4:
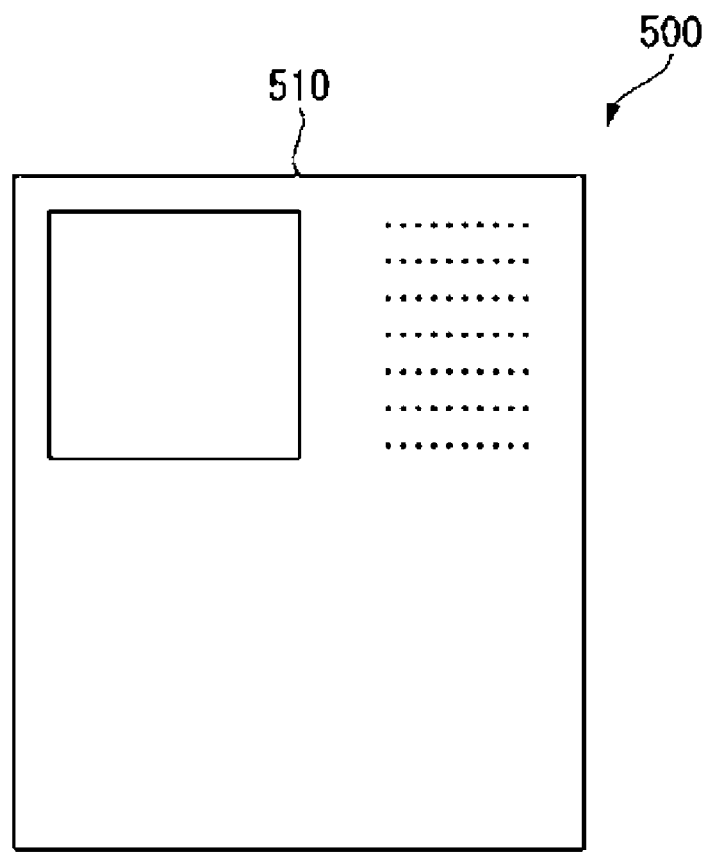
FIG. 4 is a diagram illustrating an example of a document.

Accordingly, the reading direction is uniquely determined, for example, if the side where reading is first started is specified. Therefore, the reading direction image in this embodiment is an image for specifying the side of the document on which reading is first started by the line sensor, of the four sides of the document. A specific description will be made with reference to the drawings. FIG. 4 is a diagram illustrating an example of a document. A document 500 is illustrated in FIG. 4. Of the four sides of the document 500, the side read first by the scanner 300 is denoted by reference numeral 510.

Figure 5:
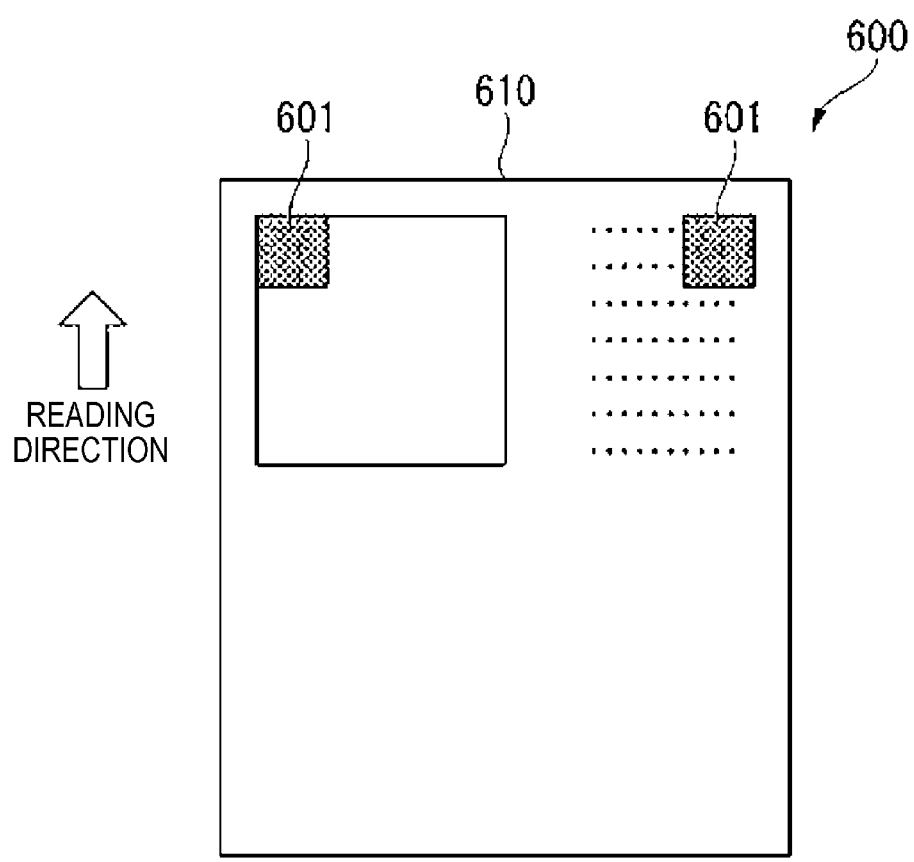
FIG. 5 is a diagram illustrating a combined image that includes an image of the document and a reading direction image.

FIG. 5 is a diagram illustrating a combined image 600 that includes an image of the document and the reading direction image. The reading direction image is constituted by using one or more symbols. In the example of FIG. 5, two symbols (for example, a rectangle, more specifically a square) are disposed side by side in the direction perpendicular to the reading direction. As long as the reading direction can be determined, the reading direction image need not be limited to a specific shape. In the combined image 600, the side corresponding to side 510 of the document 500 is the side

610. This side 610 is specified by the reading direction image 601 which includes a combination of two symbols. As a result, the reading direction is easily specified.

Image data may be recorded in the HDD 106 at a resolution different from resolution at which the document was read. For example, in some cases, the resolution when reading a document is 600 dpi, and the resolution of image data recorded in the HDD 106 is 300 dpi. In this case, if the reading direction image is combined as it is, a part of the reading direction image may be missing.

Figure 6:
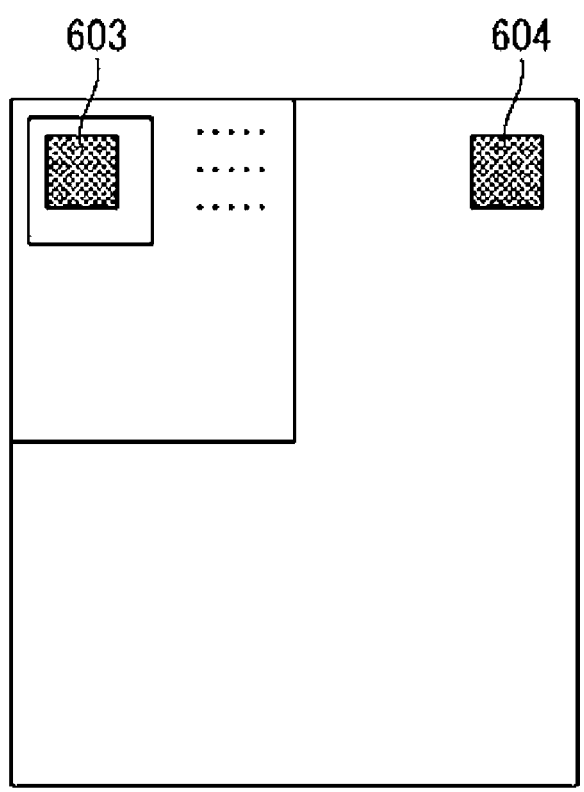
FIG. 6 is a diagram illustrating an example in which a part of a reading direction image is missing.

FIG. 6 is a diagram illustrating an example in which a part of the reading direction image is missing. Since the resolution becomes smaller, the image data recorded in the HDD 106 also becomes a smaller image. Therefore, as illustrated in FIG. 6, one symbol 603 constituting the reading direction image is combined with the image of the document, but the other symbol 604 is missing because it is not combined with the image of the document.

Therefore, the image processing unit 111 determines the position where the reading direction image is disposed and the size of the reading direction image based on the reading resolution and the recorded resolution so that a part of the reading direction image is not missing. Correction of the combining position of the reading direction image and correction of the size of the reading direction image are collectively referred to as reading direction image correction processing. An example of the reading direction image correction processing will be described below.

First, coordinates of the combining position of each symbol in the reading direction image if the reading resolution and the recorded resolution are the same are set as (XPOS1, YPOS1) and (XPOS2, YPOS2), respectively. The reading resolution is set as IN_DPI and the recorded resolution is set as OUT_DPI. A correction coefficient K is set as OUT_DPI/IN_DPI. The horizontal and vertical lengths of the reading direction image if the reading resolution and the recorded resolution are the same are set as XSIZE and YSIZE, respectively.

Then, the image processing unit 111 derives (K×XPOS1, K×YPOS1) and (K×XPOS2, K×YPOS2) as coordinates of the corrected combining position. The image processing unit 111 derives K×XSIZE and K×YSIZE as corrected lengths in the horizontal direction and vertical direction of the reading direction image. For example, if the IN_DPI is 600 dpi and the OUT_DPI is 300 dpi, since the correction coefficient is 0.5, the reading direction image becomes a symbol whose length and width are halved, respectively.

Figure 7:
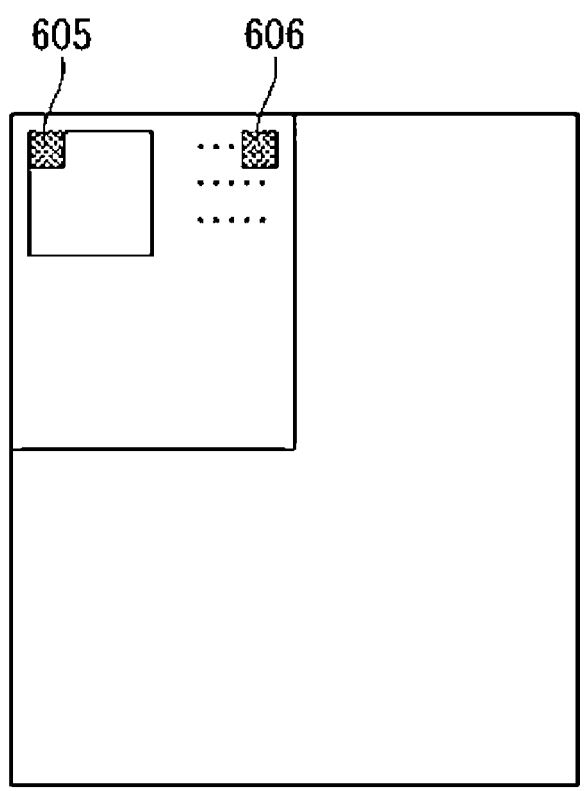
FIG. 7 is a diagram illustrating an example of a corrected combined image that includes the image of the document and the reading direction image.

FIG. 7 is a diagram illustrating an example of a corrected combined image that includes the image of the document and the reading direction image. As illustrated in FIG. 7, both a symbol 605 and a symbol 606 of the reading direction image are not missing, and the size thereof is also corrected. By doing so, the reading direction can be specified even if the reading resolution and the recorded resolution are different. If the image data is printed, since the image data is printed after returning to the reading resolution, the size of the reading direction image is restored to the original size thereof, and thus the size of the reading direction image can be kept constant.

Next, the reading direction image during copying will be described. In copying, the document is read first, and magnification-varying (enlargement or reduction) is performed according to designated magnification, and the reading direction image is printed on a sheet of a designated size. If the position and size of the reading direction image change according to magnification-varying, the serviceman may not be able to determine whether or not the image printed on the sheet is the original image on the document or the reading direction image. The RAM 103 records whether or not to perform magnification-varying and the magnification when performing magnification-varying. The image processing unit 111 determines whether or not to perform magnification-varying and the like by referring to the RAM 103.

Therefore, even when forming an image on a sheet by performing magnification-varying on the image, the image processing unit 111 combines the reading direction image with the image of the sheet without changing the position where the reading direction image is combined and the size of the reading direction image.

Figure 8:
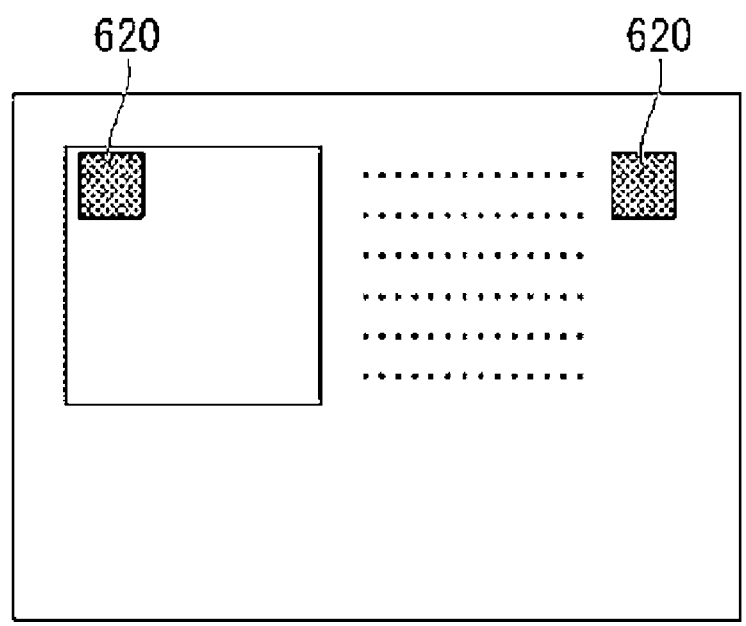
FIG. 8 is a diagram illustrating an example of a sheet on which the image of the document and the reading direction image are printed with no magnification.
Figure 9:
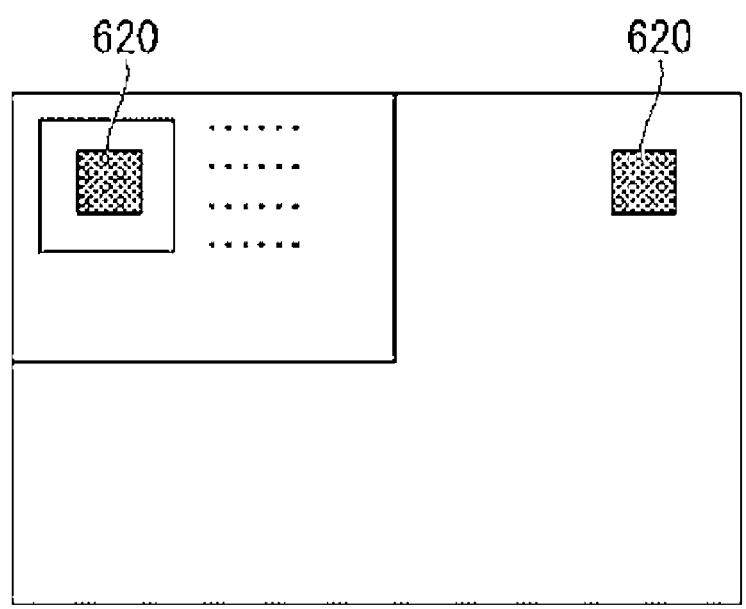
FIG. 9 is a diagram illustrating an example of a sheet on which the image of the document is reduced and printed along with the reading direction image that has not been reduced.
Figure 10:
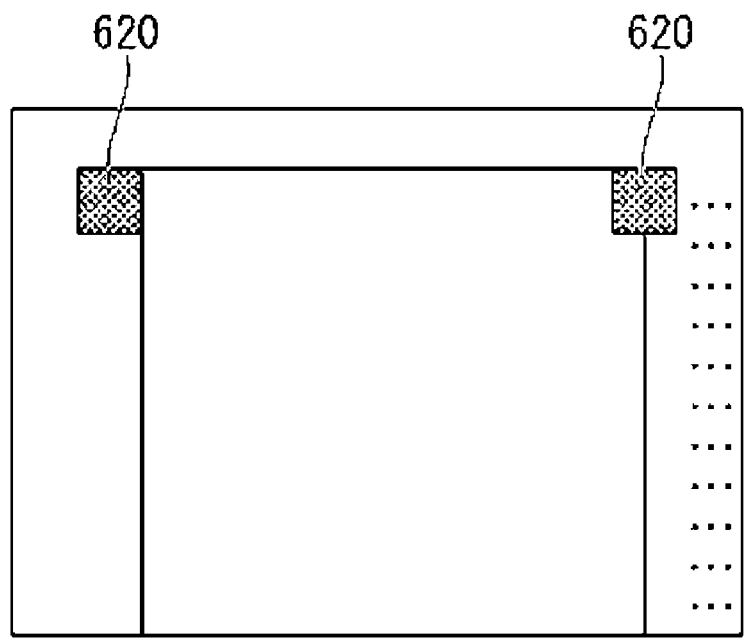
FIG. 10 is a diagram illustrating an example of a sheet on which the image of the document is enlarged and printed along with the reading direction image that has not been enlarged.

FIG. 8 is a diagram illustrating an example of a sheet on which the image of the document and the reading direction image are printed with no magnification. FIG. 9 is a diagram illustrating an example of a sheet on which the image of the document is reduced and printed along with the reading direction image that has not been reduced. FIG. 10 is a diagram illustrating an example of a sheet on which the image of the document is enlarged and printed along with the reading direction image that has not been enlarged.

All of FIGS. 8, 9, and 10 show that printing is performed without changing the position where each symbol 620 of the reading direction image is combined with the original image and the size of each symbol 620 of the reading direction image. By doing so, the serviceman can determine whether or not the image printed on the sheet is the original image of the document or the reading direction image.

Next, combining the image forming direction image indicating the image forming direction with the image to be printed will be described. Here, the image forming direction is the conveying direction of the sheet passing through the secondary transfer unit 18.

The image forming direction can be uniquely determined if, for example, the side of the sheet that first passes through the secondary transfer unit 18 is specified. Therefore, the image forming direction image in this embodiment is an image specifying the side of the sheet that first passes through the secondary transfer portion 18 of the four sides of the sheet. The conveying direction of the sheet is determined by the orientation of the sheet in the sheet accommodation unit 140. Therefore, the image processing unit 111 generates image data obtained by combining the image forming direction image according to the orientation of the sheets in the sheet accommodation unit 140. The orientation of the sheet is recorded in the RAM 103 for each cassette of the sheet accommodation unit 140. The image processing unit 111 records the combined image data in the HDD 106. The image data recorded in the HDD 106 is output to the printer 400.

Figure 11:
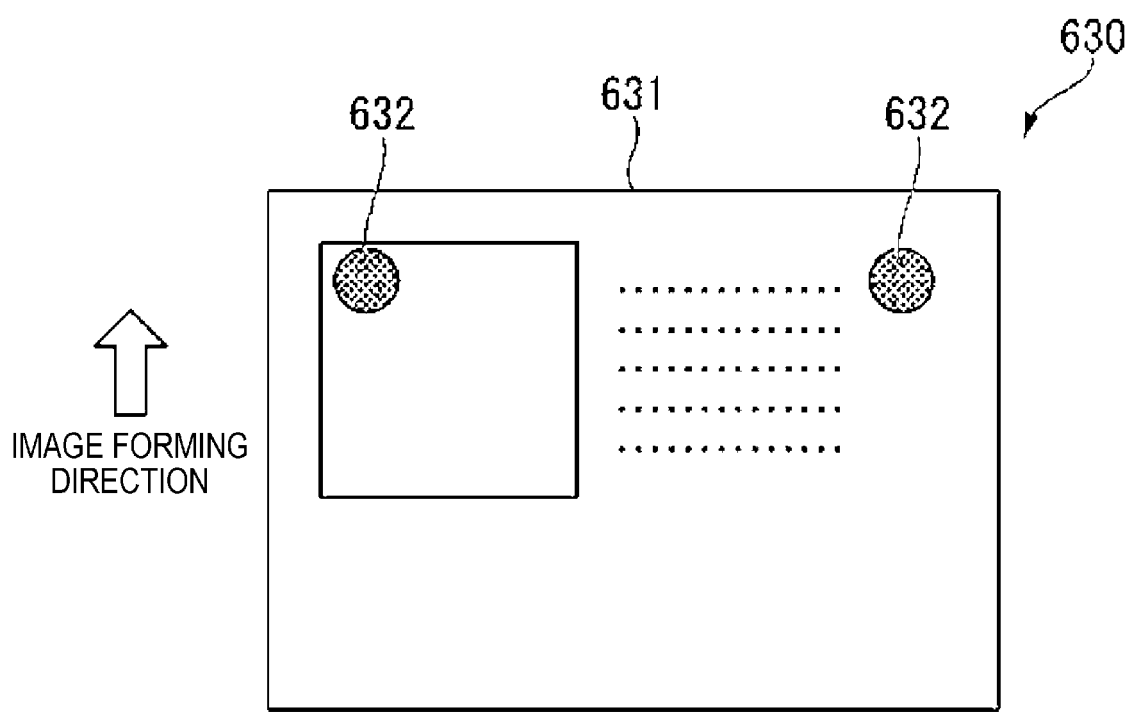
FIG. 11 is a diagram illustrating an example of a printed sheet on which an image forming direction image is printed.

FIG. 11 is a diagram illustrating an example of a printed sheet on which the image forming direction image is printed. A printed sheet 630 is illustrated in FIG. 11. Of four sides of the printed sheet 630, the side that first passes through the secondary transfer unit 18 is a side 631. This side 631 is specified by two symbols 632 that constitute the imaging direction image. As a result, the image forming direction is easily specified.

As illustrated in FIG. 11, the imaging direction image 632 is circular. That is, the symbols of the reading direction images illustrated in FIGS. 5 to 10 and the symbols of the image forming direction image illustrated in FIG. 11 are in different styles. In the case of FIG. 11, the reading direction image and the image forming direction image are in styles in which the shapes thereof are made different, respectively, in order to distinguish between the reading direction image and the image forming direction image, but the reading direction image and the image forming direction image may be in styles in which the size, color, density, pattern, and the like thereof are made different. Even when the image is subjected to magnification-varying and printed on the sheet, the image processing unit 111 combines the image forming direction image with the image to be printed without changing the size of the image forming direction image. As a result, the serviceman can determine whether or not the image printed on the sheet is the original image of the document or the image forming direction image.

Figure 12:
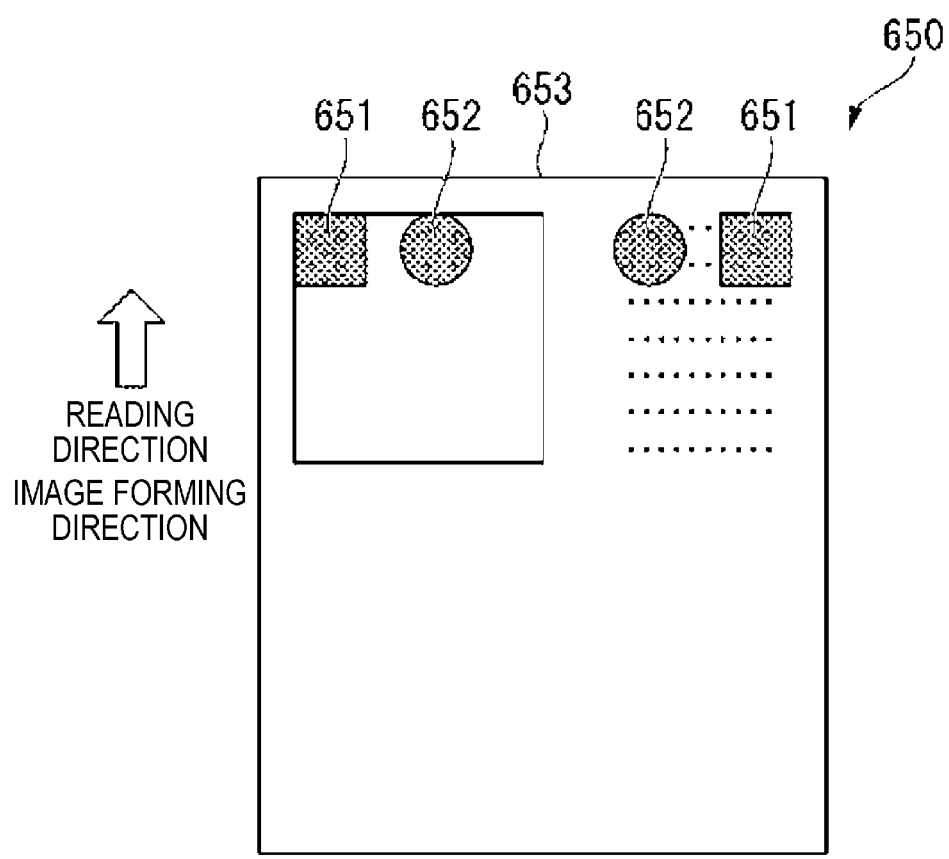
FIG. 12 is diagram illustrating an example of a sheet on which an image forming direction image and a reading direction image are printed.
Figure 13:
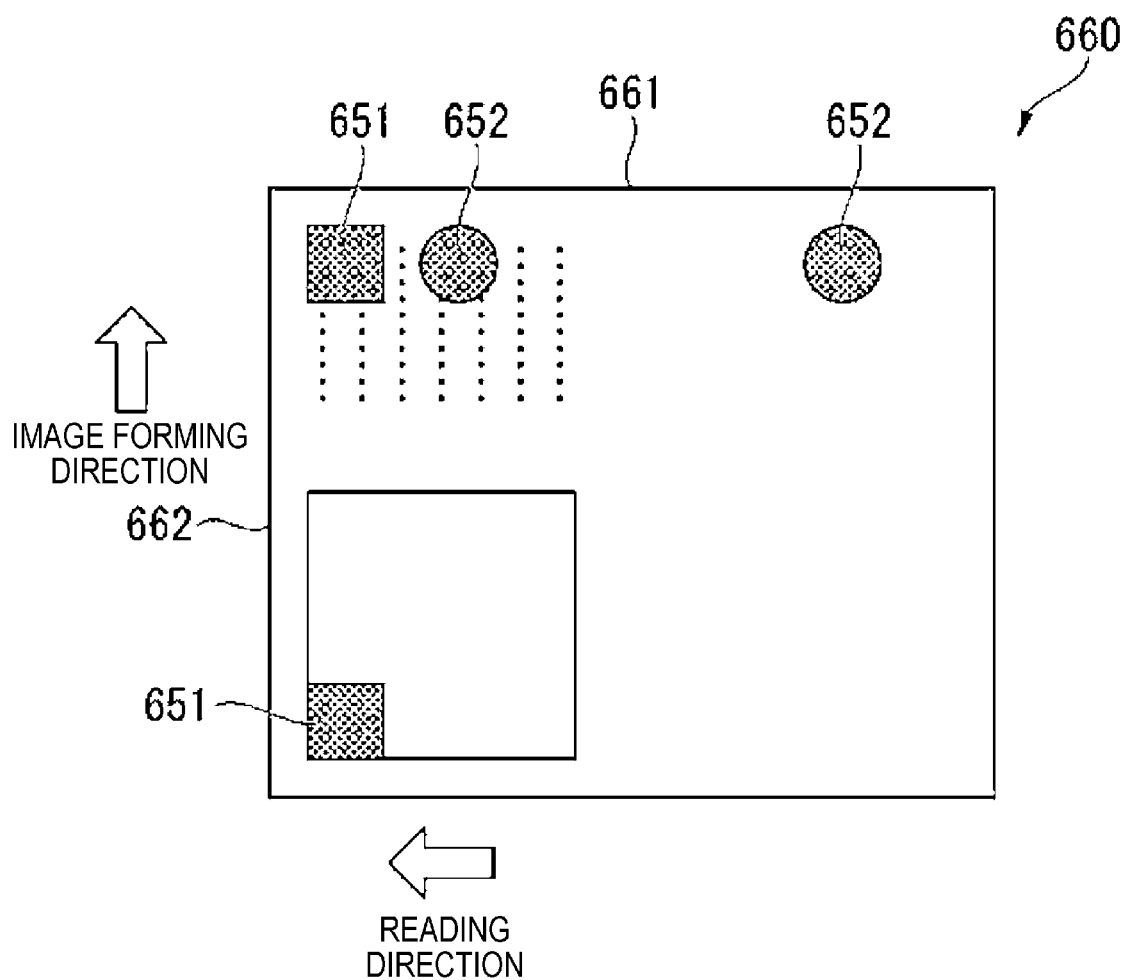
FIG. 13 is a diagram illustrating another example of a sheet on which the image forming direction image and the reading direction image are printed.

The image forming apparatus 1 can also combine the image forming direction image and the reading direction image to be printed. FIGS. 12 and 13 are diagrams illustrating examples of the sheet on which the image forming direction image and the reading direction image are printed. In the examples illustrated in FIGS. 12 and 13, a size of the sheet is A4. In the examples illustrated in FIGS. 12 and 13, the reading direction is a forward direction of A4. Here, the forward direction of A4 is a direction perpendicular to a short side of A4.

In the examples illustrated in FIGS. 12 and 13, the orientation of the sheets in the sheet accommodation unit 140 is different by 90 degrees. Specifically, the orientation of the sheet in the example illustrated in FIG. 12 is such that the conveying direction of the sheet is the forward direction of A4. The orientation of the sheet in the example illustrated in FIG. 13 is the orientation (A4-R) in which the conveying direction of the sheet is perpendicular to the forward direction of A4.

Therefore, in the example illustrated in FIG. 12, since the reading direction and the image forming direction are the same, a reading direction image 651 and an image forming direction image 652 are combined so as to indicate the same direction. On the other hand, in the example illustrated in FIG. 13, since the reading direction and the image forming direction are different directions, the reading direction image 651 and the image forming direction image 652 are combined so as to indicate different directions. As such, since the reading direction and the printing direction can be easily specified, the time and labor required for the defect investigation by the serviceman can be greatly reduced.

As illustrated in FIGS. 12 and 13, the reading direction image 651 and the image forming direction image 652 are combined so as not to overlap each other. For example, two patterns of combining positions of the image forming direction image are prepared. One of the two patterns indicates a position when combining only the image forming direction image. The other indicates a position where the image forming direction image does not overlap with the reading direction image, if the reading direction image and the image forming direction image are combined at the same time. As a result, the image processing unit 111 can combine the reading direction image and the image forming direction image so as not to overlap with each other.

Next, a reading mode and an image forming mode will be described.

FIG. 14 is a diagram illustrating an example of a reading direction image for each reading mode. In the reading direction image, a pattern (shape) correlated with a selected reading mode is combined with the image of the document. The HDD 106 stores a plurality of types of reading modes as predetermined parameters when reading the document. The reading modes are displayed on the operation panel so as to be selectable when the document is read, and the document is read with the parameter according to the selected mode. The image processing unit 111 records information on the selected reading mode in the HDD 106.

The reading modes include, for example, a character reading mode, a photograph reading mode, a character and photograph reading mode, and the like. The character reading mode is a mode suitable for reading characters. The character reading mode is stored in the HDD 106 in correlation with a symbol 671 with a square, for example. The photograph reading mode is a mode suitable for reading a photograph.

The photograph reading mode is stored in the HDD 106 in correlation with, for example, a symbol 672 in which a square is divided into four. The character and photograph reading mode is suitable for reading a document containing both the character and the photograph. The character and photograph reading mode is stored in the HDD 106 in correlation with, for example, a symbol 673 in which a square is vertically divided into two. Others refer to a mode if reading is performed using a parameter other than the reading mode stored in the HDD 106. Others, for example, are stored in the HDD 106 in correlation with a symbol 674 in which a square is hollowed out by a smaller square.

FIG. 15 is a diagram illustrating an example of the image forming direction image for each image forming mode. In the image forming direction image, a pattern (shape) correlated with a selected image forming mode is combined with the image to be printed. The HDD 106 stores a plurality of types of image forming modes as predetermined parameters when forming an image. The image forming mode is displayed on the operation panel so as to be selectable when the image is formed, and the image is formed on the sheet with the parameter according to the selected mode.

The image forming modes include, for example, a character forming mode, a photograph forming mode, a character and photograph forming mode, a grayscale mode, and the like. The character forming mode is a mode suitable for reproducing characters on the sheet. The character forming mode is stored in the HDD in correlation with, for example, a symbol 681 with a circle. The photograph forming mode is a mode suitable for reproducing a photographic image on the sheet. The photograph forming mode is stored in the HDD 106 in correlation with, for example, a symbol 682 in which a circle is divided into four. The character and photograph forming mode is a mode suitable for forming an image containing both the character and the photograph on the sheet.

The character and photograph forming mode is stored in the HDD 106 in correlation with, for example, a symbol 683 in which a circle is vertically divided into two. The grayscale mode is a mode in which an image is formed on the sheet by achromatic shade without using a chromatic color. The grayscale mode is stored in the HDD 106 in correlation with, for example, a symbol 684 in which a circle is divided into three parts located in left, center, right, respectively. Others refer to a mode if an image is formed on the sheet using parameters other than the image forming mode stored in the HDD 106. Others, for example, are stored in the HDD in correlation with a symbol 685 in which a circle is hollowed out by a small square.

In FIGS. 14 and 15, the different types of reading mode and image forming mode are represented with styles, in which the shape is made different, respectively, but may be represented with styles, in which the size, color, density, or pattern are made different, respectively. As a result, the serviceman can visually determine in which reading mode the document was read based on the reading direction image. The service person can visually determine in which image forming mode the printed sheet was printed based on the image forming direction image.

Figure 16:
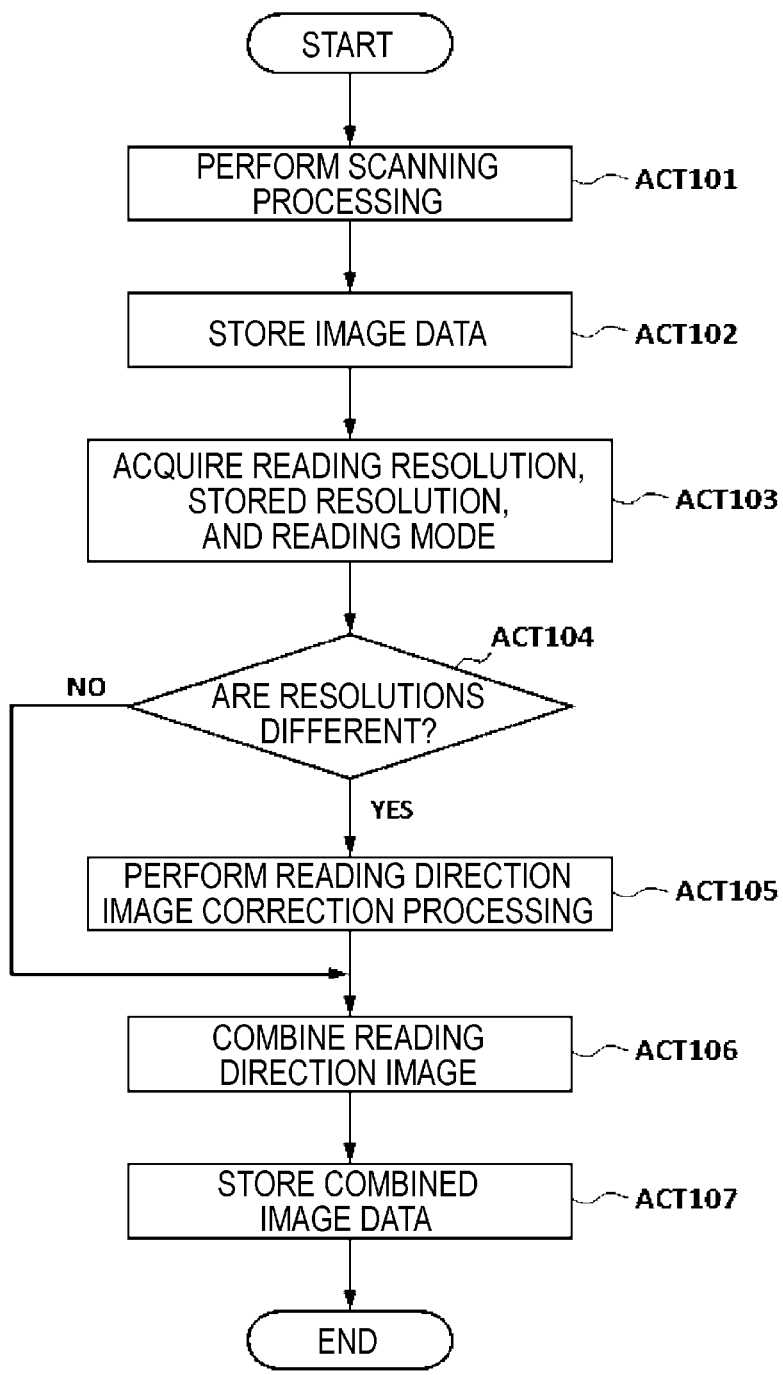
FIG. 16 is a flowchart illustrating a flow of a process of combining a read image and a reading direction image.

The process described above will be described with reference to a flowchart. FIG. 16 is a flowchart illustrating a flow of a process of combining the read image and the reading direction image. The scanner 300 performs scanning processing (ACT 101). Image data generated by the scanning processing is recorded in the page memory 109. The image processing unit 111 performs image processing on the image data recorded in the page memory 109, and records the image data in the HDD 106 (ACT 102).

The image processing unit 111 acquires the image data recorded in the HDD 106 and the reading resolution, the recorded resolution, and the parameters of the reading mode from the image data (ACT 103). The image processing unit 111 determines whether or not the acquired reading resolution and recorded resolution are different (ACT 104). If it is determined that the reading resolution and the recorded resolution are equal (NO in ACT 104), the image processing unit 111 proceeds to ACT 106. If it is determined that the reading resolution and the recorded resolution are equal (NO in ACT 104), the image processing unit 111 performs the reading direction image correction processing described above (ACT 105).

The image processing unit 111 combines the reading direction image (ACT 106). Here, if the reading direction image correction processing is performed, the image processing unit 111 combines the reading direction image at the position and with the size derived by the reading direction image correction processing. If the reading resolution and the recorded resolution are equal, the image processing unit 111 combines the reading direction image at the position and with the size according to the reading resolution. The combined reading direction image has a pattern (shape) corresponding to the reading mode selected when reading the document. The image processing unit 111 records the combined image data in the HDD 106 (ACT 107), and ends the process.

Figure 17:
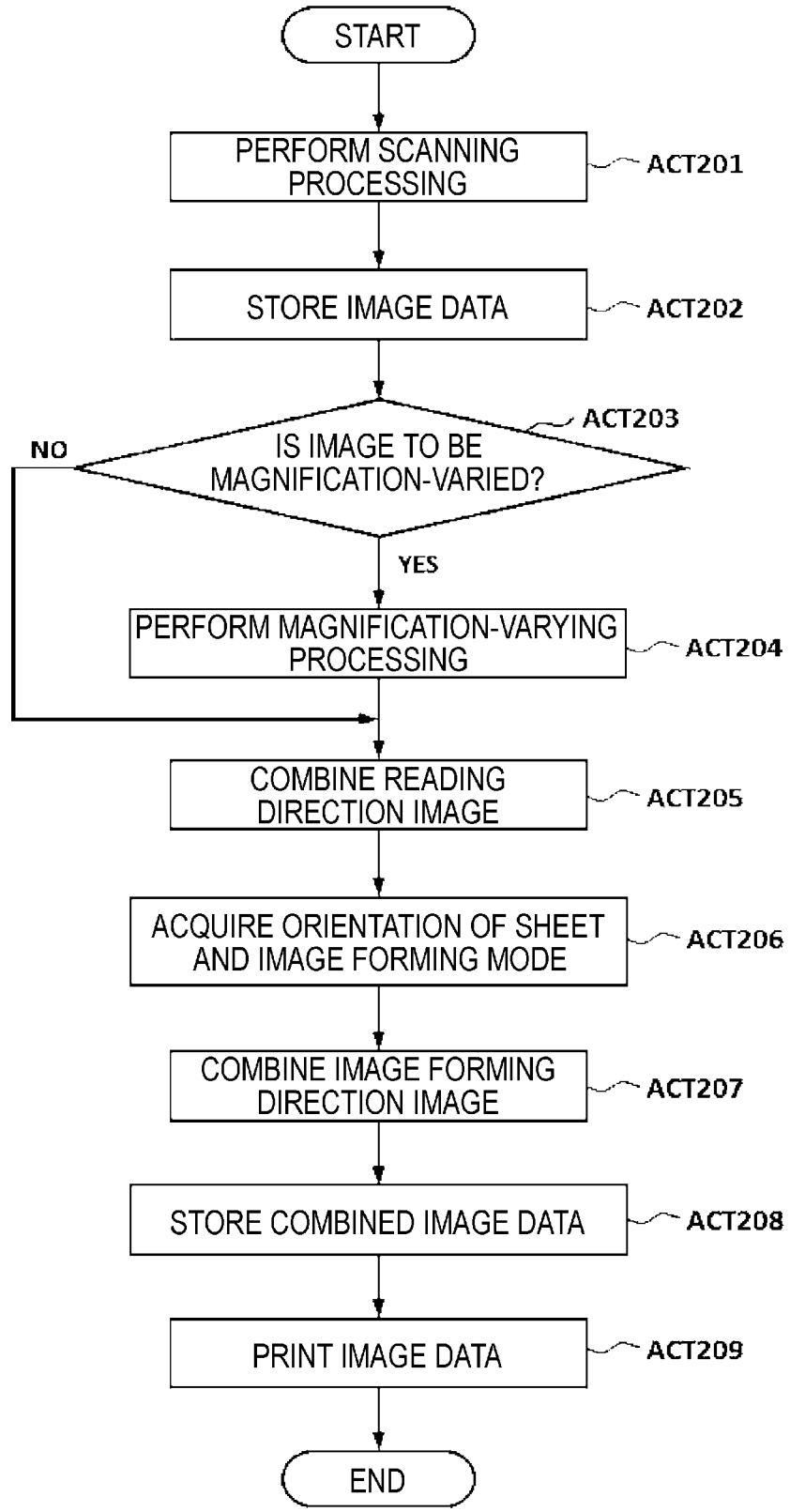
FIG. 17 is a flowchart illustrating a flow of a process of combining the reading direction image and the image forming direction image during copying.

FIG. 17 is a flowchart illustrating a flow of a process of combining the reading direction image and the image forming direction image during copying. The scanner 300 performs scanning processing (ACT 201). Image data generated by scanning processing is recorded in the page memory 109. The image processing unit 111 performs image processing on the image data recorded in the page memory 109, and records the image data in the HDD 106 (ACT 202).

The image processing unit 111 determines whether or not the image is to be copied by performing magnification-varying on the image (ACT 203). If it is determined that the image is not to be copied by performing magnification-varying on the image (NO in ACT 203), the image processing unit 111 proceeds to ACT 205. If it is determined that the image is to be copied by performing magnification-varying on the image (YES in ACT 203), the image processing unit 111 performs magnification-varying processing (ACT 204). Magnification and the like to be used for performing magnification-varying on the image are recorded in the RAM 103 as described above. The image processing unit 111 combines the reading direction image (ACT 205).

The image processing unit 111 acquires the orientation of the sheet on which an image is to be formed in the sheet accommodation unit 140 and the image forming mode (ACT 206). The image processing unit 111 combines the image forming direction image according to the acquired orientation (ACT 207). The combined image forming direction image has a pattern (shape) corresponding to the image forming mode selected when forming the image. The image processing unit 111 records the combined image data in the HDD 106 (ACT 208). The image processing unit 111 converts the image data recorded in the HDD 106 into image data for printing (for example, raster data) and outputs the image data to the printer 400. The printer 400 prints using the input image data (ACT 209), and ends the process.

In the embodiments described above, a plurality of reading direction images in different styles may be provided. For example, reading direction images in different styles may be combined so that image data generated from the document placed on a platen glass and image data generated by the ADF 305 can be distinguished. If the ADF 305 is capable of reading both sides of the document, reading direction images in different styles may be combined so that image data generated from a front surface and image data generated from a back surface can be distinguished.

The main CPU 101 and the image processing unit 111 may be installed in the same processor. In addition, an image forming apparatus according to some embodiments does not include the printer 400.

According to the image forming apparatus 1 of the embodiment described above, an image forming apparatus capable of easily specifying the reading direction can be provided. Further, according to the image forming apparatus 1 of the embodiment, an image forming apparatus capable of easily specifying the selected reading mode can be provided.

The functions of the image forming apparatus in the embodiment described above may be realized by a computer. In that case, the functions of the image forming apparatus may be realized by allowing a program for realizing those functions to be recorded in a computer-readable recording medium, and causing the program recorded in this recording medium to be read into and executed by a computer system. The term "computer system" here includes an OS and hardware such as peripheral devices. The term "computer-readable recording medium" refers to a portable medium such as a flexible disk, a magneto-optical disk, a ROM, a CD-ROM, and the like, and a storage device such as a hard disk built into the computer system. The term "computer-readable recording medium" may also include those that dynamically store a program for a short period of time, such as a communication channel for transmitting the program via a network such as the Internet and communication line such as a telephone line. In that case, the "computer-readable recording medium" may also include a memory that stores the program for a certain period of time, such as a volatile memory inside a computer system that serves as a server or client. The program may be for realizing a part of the functions described above, or may be a program capable of realizing the functions described above in combination with a program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An image forming apparatus comprising:
a scanner configured to read an image of a document and generate image data of the image according to a reading mode;

a storage device configured to store the image data and the reading mode that was set as a parameter of the scanner when reading the image of the document;

a processor configured to generate a first combined image that includes the image of the document and a reading direction image that indicates a reading direction of the scanner and has a shape indicating the reading mode, and store data of the first combined image in the storage device, wherein the processor is configured to determine a position where the reading direction image is to be disposed relative to the image of document in the first combined image and a size of the reading direction image in the first combined image, based on a first resolution indicating a reading resolution of the scanner and a second resolution indicating a resolution of the image data stored in the storage device.

2. The image forming apparatus according to claim 1, further comprising:

a printer configured to form an image on a sheet, wherein the processor is configured to generate a second combined image for printing by the printer, the second combined image including an image of the document, a size of which is varied according to a magnification setting of the printer, and a reading direction image, a size of which is not varied according to the magnification setting of the printer.

3. The image forming apparatus according to claim 2, wherein the printer is configured to operate according to an image forming mode, and the processor is configured to add to the second combined image an image forming direction image that indicates an image forming direction of the printer and has a shape indicating the image forming mode.

4. The image forming apparatus according to claim 3, wherein a size of the image forming direction image in the second combined image is not varied according to the magnification setting of the printer.

5. The image forming apparatus according to claim 4, wherein the reading direction image and the image forming direction image are in different styles.

6. The image forming apparatus according to claim 3, wherein the reading direction image and the image forming direction image in the second combined image are in different styles.

7. The image forming apparatus according to claim 3, wherein the printer is configured to operate according to one of a plurality of image forming modes, each of which is represented by a different shape.

8. The image forming apparatus according to claim 1, wherein the scanner is configured to operate according to one of a plurality of image reading modes, each of which is represented by a different shape.

9. The image forming apparatus according to claim 1, wherein a controller is configured to cause the printer to print the first combined image after storing the data of the first combined image data in the storage device.

10. The image forming apparatus according to claim 1, further comprising:

a display configured to display information about the image forming apparatus; and an operation key configured to receive an input from a user and output a signal corresponding to an operation to the processor.

11. A method of controlling an image forming apparatus including a scanner configured to read an image of a document and generate image data of the image according to a reading mode and storage device storing the image data and the reading mode that was set as a parameter of the scanner when reading the image of the document, the method comprising:

generating a first combined image that includes the image of the document and a reading direction image that indicates a reading direction of the scanner and has a shape indicating the reading mode;

determining a position where the reading direction image is to be disposed relative to the image of document in the first combined image and a size of the reading direction image in the first combined image, based on a first resolution indicating reading resolution of the scanner and a second resolution indicating a resolution of the image data stored in the storage device; and storing data of the first combined image in the storage device.

12. The method according to claim 11, wherein image forming apparatus further includes a printer configured to form an image on a sheet, said method further comprising:

generating a second combined image for printing by the printer, the second combined image including an image of the document, a size of which is varied according to a magnification setting of the printer, and a reading direction image, a size of which is not varied according to the magnification setting of the printer.

13. The method according to claim 12, wherein the printer is configured to operate according to an image forming mode, said method further comprising:

adding to the second combined image an image forming direction image that indicates an image forming direction of the printer and has a shape indicating the image forming mode.

14. The method according to claim 13, wherein a size of the image forming direction image in the second combined image is not varied according to the magnification setting of the printer.

15. The method according to claim 14, wherein the reading direction image and the image forming direction image are in different styles.

16. The method according to claim 13, wherein the reading direction image and the image forming direction image in the second combined image are in different styles.

17. The method according to claim 13, wherein the printer is configured to operate according to one of a plurality of image forming modes, each of which is represented by a different shape.

18. The method according to claim 11, wherein the scanner is configured to operate according to one of a plurality of image reading modes, each of which is represented by a different shape.

19. The method according to claim 11, further comprising:

instructing the printer to print the first combined image after storing the data of the first combined image in the storage device.

* * * * *